United States Patent [19]

Mote et al.

[11] 3,977,064

[45] Aug. 31, 1976

[54] SITU VALVE SPRING COMPRESSION TOOL

[75] Inventors: Charles R. Mote, Columbus; Willard E. Fleetwood, Vallonia, both of Ind.

[73] Assignee: Cummins Engine Company, Inc., Columbus, Ind.

[22] Filed: Aug. 15, 1975

[21] Appl. No.: 605,125

[52] U.S. Cl. .................................... 29/216; 29/217

[51] Int. Cl.[2] .......................................... B23P 19/04

[58] Field of Search .............. 29/216, 217, 215, 218

[56] References Cited

UNITED STATES PATENTS

| | | | |
|---|---|---|---|
| 1,510,777 | 10/1924 | Harrub et al. | 29/216 |
| 1,586,410 | 5/1926 | Cook | 29/217 |

FOREIGN PATENTS OR APPLICATIONS

| | | | |
|---|---|---|---|
| 733,039 | 3/1943 | Germany | 29/216 |

*Primary Examiner*—James L. Jones, Jr.

*Attorney, Agent, or Firm*—Gary M. Gron; Robert T. Ruff

[57] ABSTRACT

The disclosure illustrates a valve spring compressor tool which may be used to remove heavy duty double valve springs from an engine with no more disassembly of the engine than removal of the rocker cover. The tool comprises a support bridge bolted to the rocker housing across the valves to be compressed. A plate having two cup-like recesses fits over the valve springs and a central sleeve passes through the plate to guide it for movement parallel to the normal direction of compression for the springs. A shaft is threaded into the cross arm and is aligned with the sleeve so that rotation causes it to exert a compressive force of great magnitude and retains the valve in the compressed position.

6 Claims, 4 Drawing Figures

SITU VALVE SPRING COMPRESSION TOOL

Internal combustion engines of the reciprocating type utilize poppet valves to control the intake of air and exhaust of the combustion gases. The valves are spring loaded to a closed position by coil springs which are received over the valve stem and act against a valve retainer and keeper assembly. The keeper assembly is removed to disconnect the spring from the valve by pushing the valve spring retainer in a direction to compress the valve while holding the valve in its closed position. When the keeper assembly is removed, the valve spring is expanded and then removed.

Many different types of tools have been used for compressing the valve spring to permit this disassembly. One class of tool is particularly adapted for in situ compression of the valve spring to permit its removal without major disassembly of an engine. Frequently this type of tool will comprise a lever using some point on the engine for a fulcrum so that a mechanical advantage may be applied to compress the springs.

The above tools are quite acceptable for light duty applications such as engines for passenger cars. However, in certain diesel engine applications double valve springs are used and a pair of valves are actuated by a single rocker arm. Dual valve springs in this arrangement require forces of up to 300 pounds to compress them. Use of a lever type tool introduces several problems. One is that insufficient force can be applied by the operator to effectively compress the spring. Another is that the spring will not be maintained in a compressed position so that the operator must hold the lever in the compressed position while removing the keeper assembly. This can result in a dangerous condition if the operator's arm slips. A third problem is that the pivoting action of the lever does not produce a uniformly directed movement which can cause rocking of the retainer and keeper thereby damaging the valve.

In accordance with the present invention these problems are avoided by an in situ valve spring assembly compression tool including an elongated support element that may be connected to an internal combustion engine head for bridging the space above a valve spring assembly. A plate having a recess conforming to the upper end of the assembly is guided for movement substantially parallel to the direction of movement of the upper end of the assembly during its compression. An element is threaded into the support element in alignment with the plate for compressing the assembly in response to rotation of the threaded element.

The above and other related features of the present invention will be apparent from a reading of the following description of the disclosure shown in the accompanying drawings and the novelty thereof pointed out in the appended claims.

In the drawings:

FIG. 4 is a cross sectional view of the tool of FIG. 2 shown in a position wherein the valve spring assembly is in a compressed position.

Figure 1:
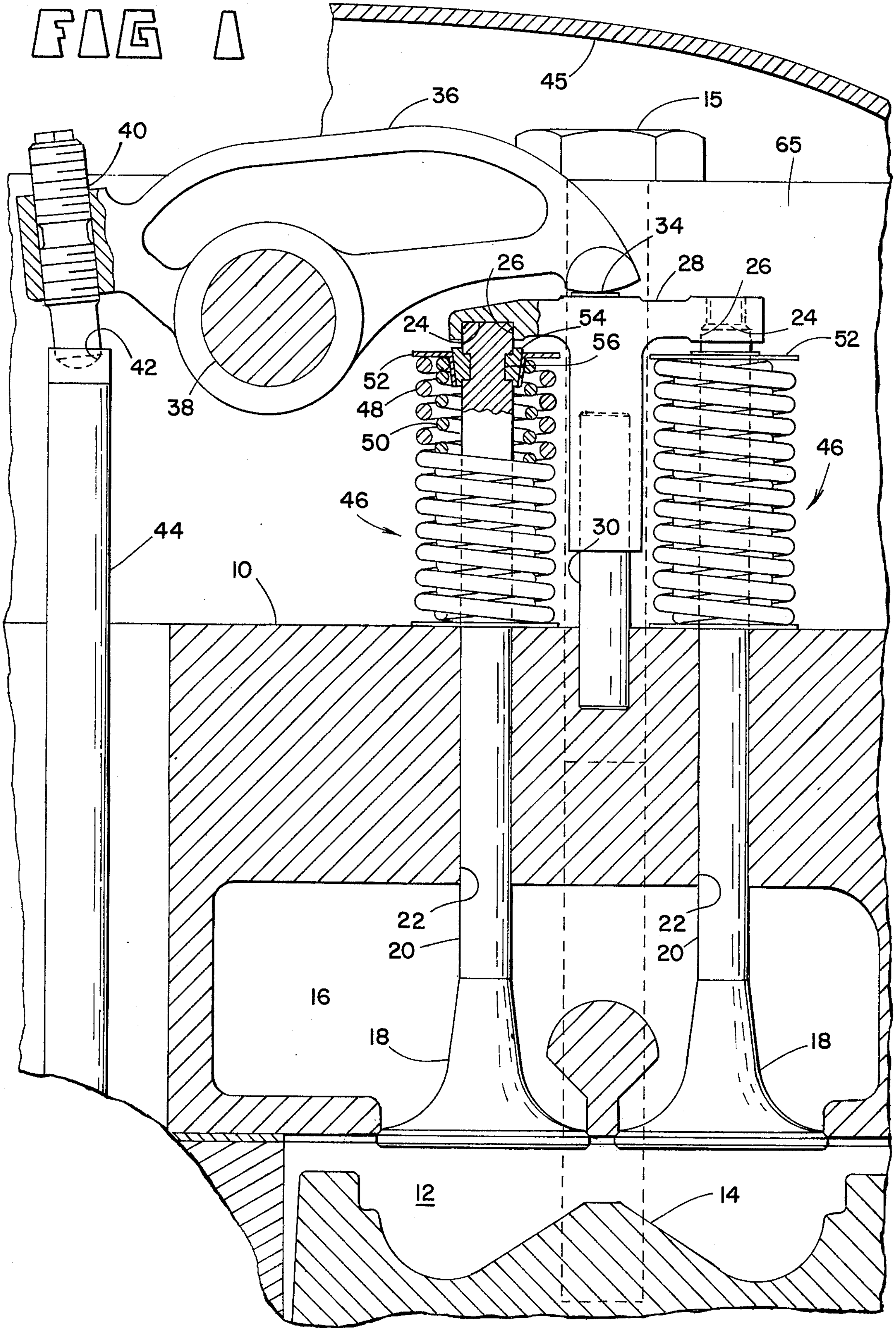
FIG. 1 is a fragmentary cross sectional view of the head portion of an internal combustion engine particularly illustrating a valve spring assembly which is to be compressed using the tool of the present invention.

FIG. 1 illustrates an internal combustion engine head 10 having a cylinder 12 in which a piston 14 is positioned for reciprocating movement. Head 10 is secured to a block assembly by suitable screws (not shown). Piston 14 pressurizes air in cylinder 12 and a combustible mixture is produced and ignited to produce rapid expansion of the gases which forces the piston 14 down. The reciprocating movement of piston 14 is converted to a rotary output by a suitable connecting rod and crankshaft arrangement (not shown). Exhaust gases are expelled from cylinder 12 to exhaust ports 16 by opening a pair of valves 18. Valves 18 each have a stem 20 extending through a bore 22 in head 10 to an upper face 24 received in a recess of a T shaped cross head assembly 28. Cross head 28 is guided for movement parallel to the line of movement of valve stems 20 by a guide pin 30 fixed in head 10 and telescoped into a bore 32 in cross head 28.

Cross head 28 has an abutment surface 34 acted on by one end of a rocker arm 36. Rocker arm 36 is pivotally mounted on a shaft 38 supported in walls 65 which surround the area in which the valve spring assemblies 46 are retained. Walls 65 are secured to head 10 by capscrews 15 to form a rocker housing. A threaded pin 40 on the opposite end of rocker arm 36 is received in a cup shaped recess 42 of a push rod 44. Push rod 44 is reciprocated by a cam (not shown) to open valves 18 at the correct time and for the proper interval. A cover 45 is secured to walls 65 by suitable fasteners (not shown).

Valves 18 are spring loaded toward their closed positions by valve spring assemblies 46. Each valve spring assembly 46 comprises outer and inner coil springs 48 and 50 respectively which abut the head 10, and an annular spring retainer 52. The valve spring retainer 52 is held in place by a keeper assembly 54. The keeper assembly 54 comprises a two-piece sleeve that is received in a groove 56 on the valve stem 20 and which has a conical outer shape. This outer shape cooperates with a similar conical recess on the valve spring retainer 52 to wedge the keeper assembly in place in response to the expansion of the springs 48 and 50.

Figure 2:
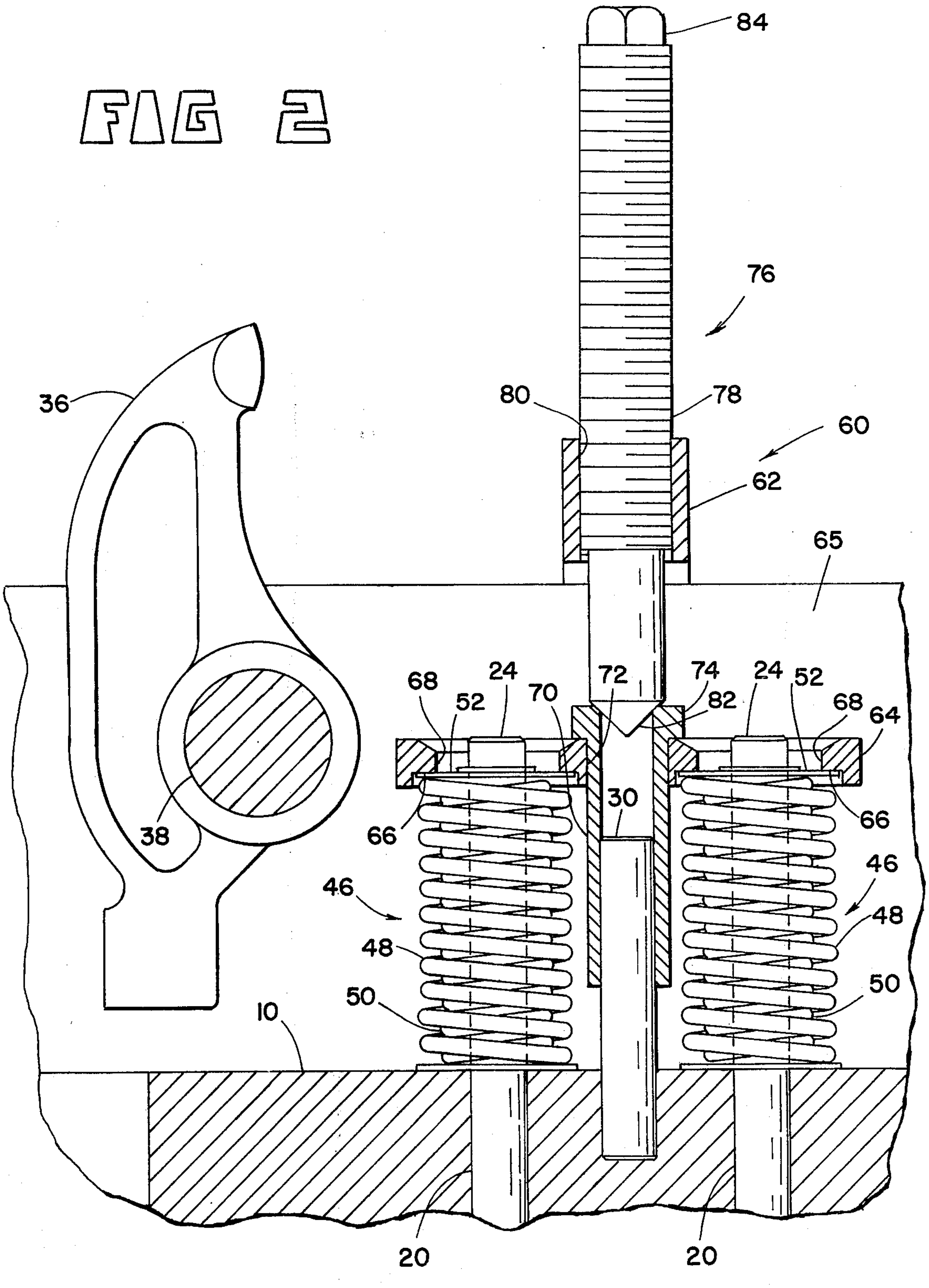
FIG. 2 is a fragmentary cross sectional view of the engine head of FIG. 1 further including an in situ valve spring assembly compression tool embodying the present invention.
Figure 3:
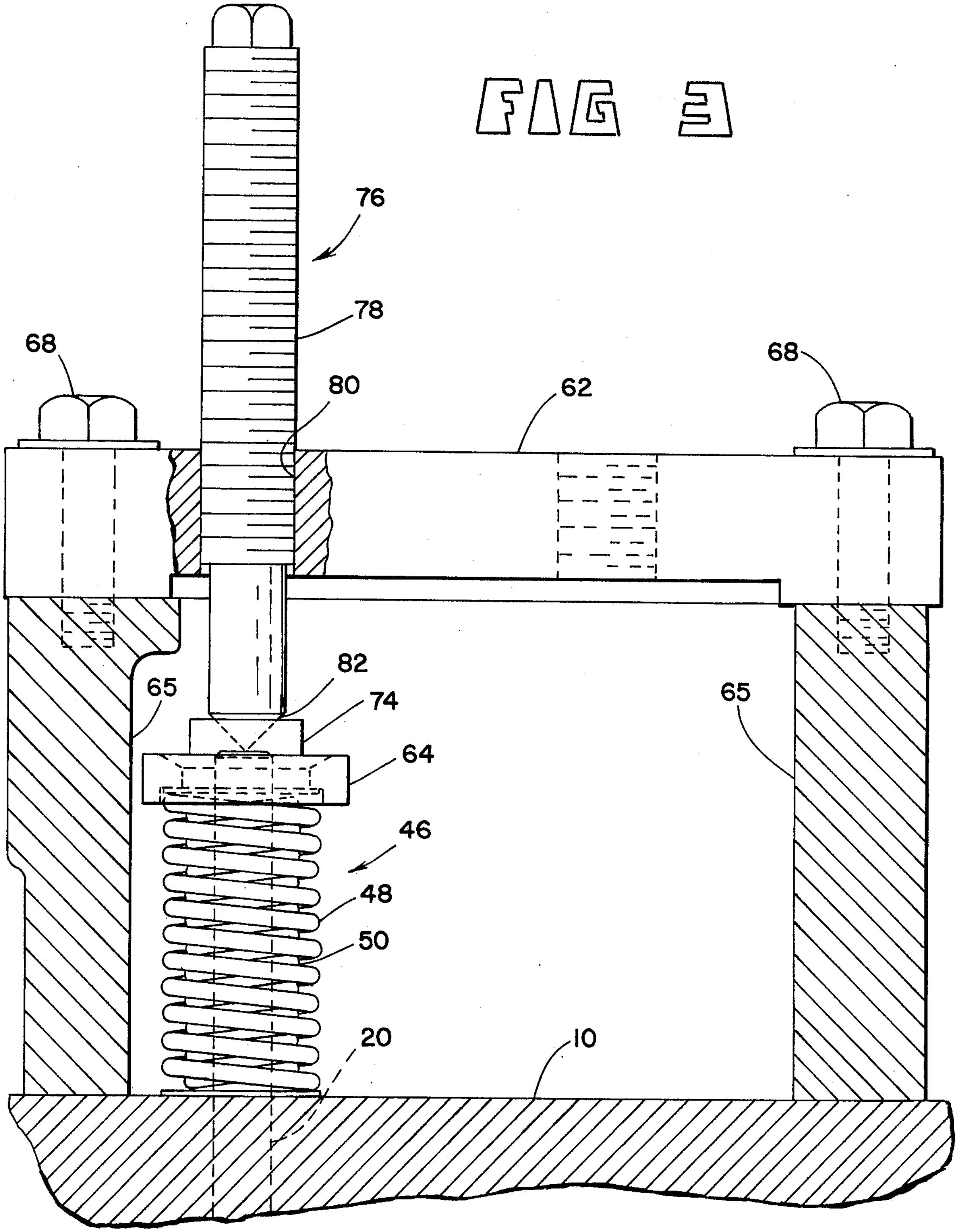
FIG. 3 is a cross sectional view of the tool of FIG. 2 taken on lines 3—3 of FIG. 2.
Figure 9:
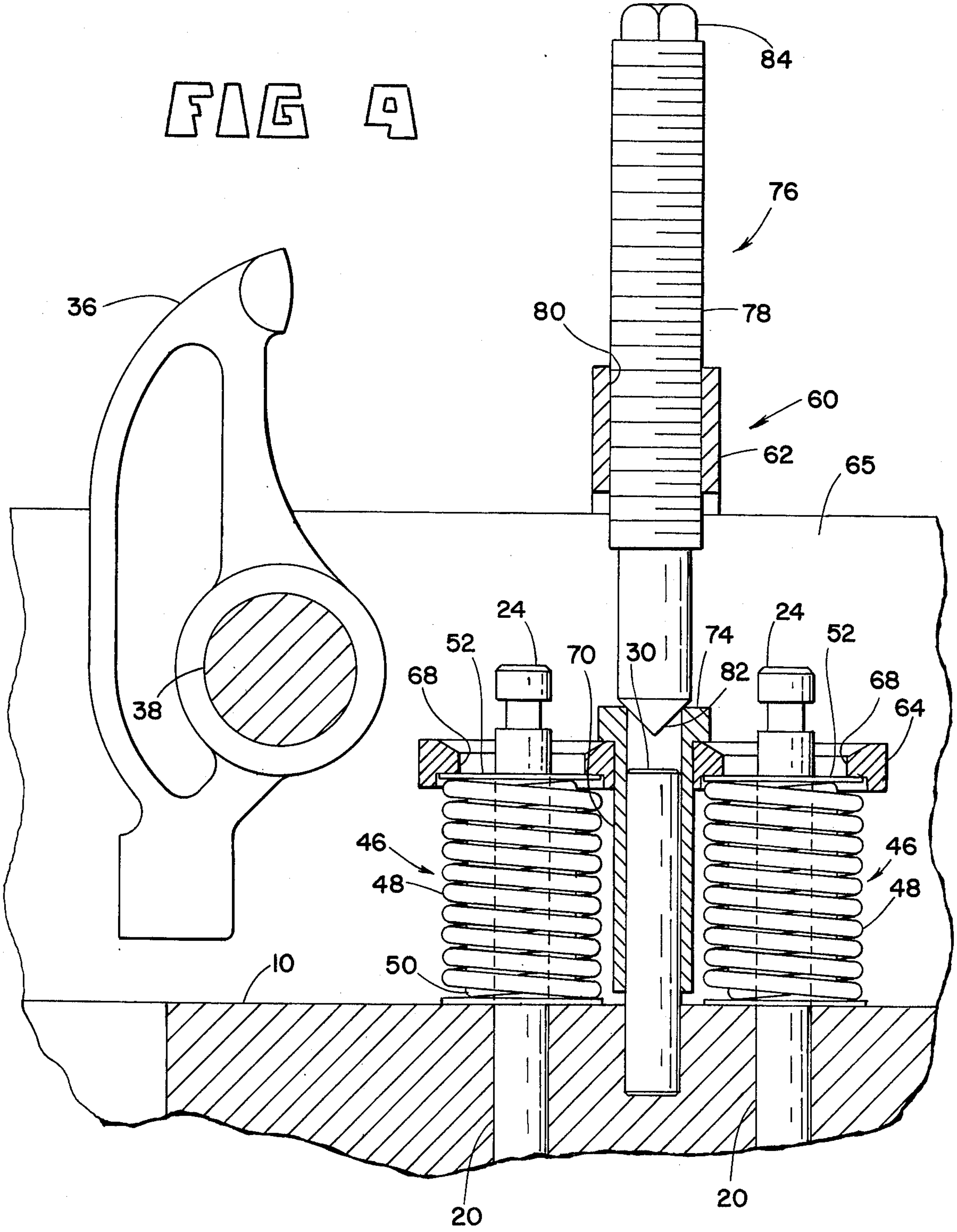

With the above arrangement, removal of the valve spring assemblies 46 entails compression of the springs 48 and 50 while the valve stems 20 are retained in their closed position. In this condition the keepers 54 are exposed for removal thus permitting the spring assembly to be freely removed. FIGS. 2 and 3 show an in situ valve spring compression tool 60 which accomplishes this purpose.

The tool 60 comprises a support bridge 62 consisting of a bar which extends between side walls 65. Support bridge 62 is releasably secured to side walls 65 by capscrews 68 extending through holes 70 in the ends of support bridge 62. As illustrated, the capscrews 68 are threaded into the same openings used to secure walls 65 to head 10. Since the capscrews 15 are in alignment with the region directly over valve spring assemblies 46, the bar may be straight sided. If however the capscrews were not in alignment the support bridge may be shaped so that a portion of it between its ends would be over the valve spring assemblies. It should also be apparent that if head 10 did not have side walls 65, support bridge 62 may contain posts at its end to elevate it to a position over the valve spring assemblies 46.

As noted in FIG. 2 the support bridge 62 extends across the valve springs to be compressed. When the valve springs are to be compressed the loosening adjusting nut 40 is loosened and the push rod 44 removed so that the rocker arm 36 may be pivoted to the position shown in FIG. 2. The cross head assembly 22 is removed and in its place a plate 64 is positioned over the valve assemblies 46. Plate 64 has annular recesses 66 which are received over the valve spring retainers 52. Access openings 68 are provided radially inward of the annular recesses 66.

A central sleeve 70 extends through a bore 72 in plate 64 and is telescoped over guide pin 30. A flange 74 at the upper end of sleeve 70 acts against plate 64 so that it is guided for movement substantially parallel to the direction of movement of valve spring assemblies 46 when they are compressed.

A shaft 76 has a threaded section 78 engaging a threaded hole 80 through support bridge 62 in line with the longitudinal axis of sleeve 70. A conical tip 82 on shaft 76 seats in the upper open end of sleeve 70. A suitable wrench engaging projection 84 enables the shaft 76 to be rotated by an operator.

In operation the push rod 44 is removed, as stated previously, and the rocker arm 36 pivoted to a position where it is out of the way of the valve spring assemblies 46. The cross head 28 is removed, the plate 64 is placed over the valve spring retainers 52 and sleeve 70 is inserted through openings 72 and over guide pin 30. Support bridge 62 is secured to the walls 65 by bolts 68 preferably using the same holes used to secure the head to the engine block. Shaft 76 is rotated so that conical tip 82 abuts the end of sleeve 70 adjacent flange 74. Shaft 76 is rotated until valve assemblies 46 are completely compressed as shown in FIG. 4. At this point the keepers 54 are exposed for removal. The threaded shaft 76 is then backed off and plate 64 and sleeve 70 removed so that the entire valve assemblies can be removed. Replacement of the valve assemblies would take place in reverse fashion.

It should be noted that there are a number of important features of the above tool. The first is that the rotary movement of shaft 76 is converted into linear movement with a high degree of force multiplication. An operator using standard mechanics tools can easily exert on the sleeve 70 and plate 64 compressive forces in excess of 300 pounds. In addition, this force is exerted substantially parallel to the direction of movement of the valve spring retainers for normal compression of the springs. This prevents rocking of the retainers which, in the past, has caused damage to the valve stem and or other components in the valve assembly. Furthermore the threaded section 78 exerts such a substantial friction on the threaded hole 80 that the shaft 76 is positively held in a pre-selected position. The advantage of this is that both of the operator's hands are free for safe removal of the keepers 54. At all times the valves are positively and securely held in the compressed position until such time as the operator wishes to release the compression. It should also be noted that relieving the compression is not done with a rapid movement as with a lever type of device, but with the slow controlled movement of the rotating shaft 76. Thus the above unit enables in situ removal of valve springs with a high degree of effectiveness and reliability.

While the preferred embodiment of the present invention has been described, it should be apparent to those skilled in the art, that it may be practiced in other forms without departing from its spirit and scope.

Having thus described the invention what is claimed as novel and desired to be secured by letters patent of the United States is:

1. A tool for in situ compression of a pair of valve spring assemblies positioned in a cylinder head of an internal combustion engine said valve assemblies having upper ends adapted to be compressed by a single input through an element abutting both of said valve spring assemblies and guided for movement parallel to the direction of movement of the upper end of said valve spring assemblies by a pin secured to said cylinder head, said cylinder head having a cover removably connected thereto for exposing said valve spring, said tool comprising:

an elongated support element releasably connectable to said head for bridging the space above said valve spring assembly;

a plate having a recess conforming to and receiving the upper end of said valve spring assembly;

a sleeve telescoped over said pin and connectable with said plate for guiding said plate substantially parallel to the direction of movement of the upper end of said valve spring assembly during compression thereof; and, an element threadedly engaging said support element and positioned in alignment with said plate for compressing said valve spring assembly in response to rotation of said threaded element.

2. Apparatus as in claim 1 wherein said cylinder head includes side walls generally surrounding said valve spring assembly and wherein said support element comprises a bar releasably securable to said walls adjacent the ends thereof for bridging the space above said valve spring assembly.

3. Apparatus as in claim 1 wherein said sleeve has a shoulder, said plate having a hole through which said sleeve extends so that said shoulder abuts said plate thereby guiding said plate for movement in said direction.

4. Apparatus as in claim 3 wherein said threaded element has a conical tip received in the upper end of said sleeve adjacent said shoulder for urging said sleeve and plate in a direction to compress said valve springs.

5. Apparatus as in claim 4 wherein said valve spring assembly has a circular upper end and wherein said plate comprises annular recesses receiving said upper ends.

6. Apparatus as in claim 5 wherein said plate has an opening radially inward of said recess for providing access to the top end of said valve spring assembly for the disassembly thereof.

* * * * *